US010678777B2

(12) United States Patent
De Wever et al.

(10) Patent No.: US 10,678,777 B2
(45) Date of Patent: Jun. 9, 2020

(54) SYSTEM AND METHOD FOR DATA AGGREGATION AND COMPARISON

(71) Applicant: Fomtech Limited, London (GB)

(72) Inventors: Martijn De Wever, London (GB); Sasha Imamovich, London (GB)

(73) Assignee: FOMTECH LIMITED, London (GB)

(*) Notice: Subject to any disclaimer, the term of this patent is extended or adjusted under 35 U.S.C. 154(b) by 254 days.

(21) Appl. No.: 15/717,605

(22) Filed: Sep. 27, 2017

(65) Prior Publication Data

US 2019/0095477 A1 Mar. 28, 2019

(51) Int. Cl.
*G06F 16/22* (2019.01)
*G06F 16/23* (2019.01)
*G06F 16/25* (2019.01)

(52) U.S. Cl.
CPC ........ *G06F 16/2365* (2019.01); *G06F 16/221* (2019.01); *G06F 16/25* (2019.01)

(58) Field of Classification Search
CPC ..... G06F 16/221; G06F 16/2365; G06F 16/25
See application file for complete search history.

(56) References Cited

U.S. PATENT DOCUMENTS 8,738,552 B2 * 5/2014 Ellingsworth ........ G06F 16/313
706/20
2009/0276446 A1 11/2009 Graf et al.
2012/0296669 A1 11/2012 Hudgins et al.
2014/0108520 A1 * 4/2014 Ma ........................ G06F 16/954
709/203
2015/0095312 A1 4/2015 Gulwani et al.
2016/0188744 A1 6/2016 Ito et al.

FOREIGN PATENT DOCUMENTS

EP 1426877 A2 6/2004
WO WO 2011/075762 A1 6/2011

OTHER PUBLICATIONS

European Patent Application No. 17193583.6; Extended Search Report; dated Jan. 3, 2018; 10 pages.

* cited by examiner

*Primary Examiner* — Cheyne D Ly
(74) *Attorney, Agent, or Firm* — BakerHostetler (57) ABSTRACT

A system and method for outputting modified input data for storage comprises a communication interface, a comparison module, a translation module and an output module. The communication interface is arranged to receive an input data set comprising a plurality of data labels. The comparison module is arranged to compare the data labels to a plurality of nomenclature-labels in a nomenclature database and identify an undefined data label by determining that at least one of the data labels is not present in the nomenclature database, based on the comparison. The translation module is arranged to translate the undefined data label into a nomenclature-label using a synonyms database. The output module is arranged to output a modified data set based on the input data set and the translated undefined label for storage.

19 Claims, 5 Drawing Sheets

John Smith - 1 January 2016

| Height (cm) | Heart Rate (bpm) | Blood Pressure (mmHg) | Weight (kg) |
|---|---|---|---|
| 185 | 80 | 120/90 | 80 |

FIG. 2B

J.Smith 01-Jan-17

| Length | BPM | B.Pressure | Kilos |
|---|---|---|---|
| 1.86m | 85 | 130/85 | 85 |

SYSTEM AND METHOD FOR DATA AGGREGATION AND COMPARISON

TECHNICAL FIELD

This disclosure relates to a system, a computer-implemented method and a computer program for outputting modified input data for storage, such that data can be aggregated and compared more accurately and efficiently.

BACKGROUND

In digital networking and communication systems, it is desirable to be able to receive information from a variety of different sources. In doing so, it is possible increase the quantity and quality of data that is available to users. However, various challenges exist when attempting to aggregate data from different sources. One such challenge is that the data labelling used in one data set in comparison to another data set may be vastly different, despite being associated with the same or similar category of data. In this situation, it may be difficult or impossible for the data processing system to identify similarities between the data sets in order to aggregate the data in an accurate manner. In addition, a given data set may be unfamiliar to the data processing system, even though it does in fact have data categories and types of data which correspond to one or more other data sets which would be processed by the data processing system. When data labels are incorrectly interpreted, inaccurate comparisons and conclusions may be drawn from the data sets.

Granted European patent 1 426 877 describes a system for selectively importing and exporting hierarchically structured data. In this system, it is assumed that elements in the data have common labels such as "service", "subscription" and "currency". These labels can be specified by the user so that the relevant data can be extracted. Since this system relies on a common labelling scheme, it is not possible for the user to automatically extract the same type of data from two different data sets for comparison, where different labels are used in the data sets.

It is desirable to provide a system that allows data to be aggregated and/or compared from a variety of different sources, in situations where the labelling structure in the input data may be inconsistent, such that meaningful comparisons can be made between different data sets.

SUMMARY

This summary is provided to introduce a selection of concepts in a simplified form that are further described below in the detailed description section. This summary is not intended to identify only key or essential features of the claimed subject matter.

In one aspect of the invention, there is provided a system for outputting modified input data for storage in a database, the system comprising: a communication interface arranged to receive an input data set comprising a plurality of data labels; a comparison module arranged to compare the data labels to a plurality of nomenclature-labels in a nomenclature database; and arranged to identify an undefined data label by determining that at least one of the data labels is not present in the nomenclature database, based on the comparison; and a translation module arranged to translate the undefined data label into a nomenclature-label using a synonyms database comprising a plurality of synonym-labels each corresponding with a nomenclature-label, wherein the translating comprises identifying a synonym-label corresponding with the undefined data label, and selecting the nomenclature-label associated with the identified synonym-label for translating the undefined data label; and an output module arranged to output a modified data set based on the input data set and the translated undefined label for storage.

In another aspect of the invention, there is provided a computer-implemented method of outputting modified input data for storage, the method comprising: receiving an input data set comprising a plurality of data labels; comparing the data labels to a plurality of nomenclature-labels in a nomenclature database; identifying an undefined data label by determining that at least one of the data labels is not present in the nomenclature database, based on the comparison; and translating the undefined data label into a nomenclature-label using a synonyms database comprising a plurality of synonym-labels each corresponding with a nomenclature-label; wherein the translating comprises identifying a synonym-label corresponding with the undefined data label, and selecting the nomenclature-label associated with the identified synonym-label for translating the undefined data label; and outputting a modified data set based on the input data set and the translated undefined label for storage.

In another aspect of the invention, there is provided a computer program comprising executable code portions which when run on a computer cause the computer to perform the methods described herein.

In another aspect of the invention, there is provided a computer-readable data carrier having stored thereon the computer program described herein.

BRIEF DESCRIPTION OF THE DRAWINGS

Various embodiments of the invention are described below by way of example only, with reference to the following drawings, in which.

DETAILED DESCRIPTION

Described herein are processing systems and methods that use a synonyms database to translate data labels of an input data set into data labels that correspond with a common nomenclature. The input data set may be one of a plurality of data sets which can be processed by the disclosed systems and methods. Each of the input data sets may contain various different types and categories of data identified by their data labels. There may be common types and categories of data across the plurality of data sets which may correspond to each other across the data sets, but the data labelling utilised for the types and categories of data across the data sets may be different. The data labelling in one or more of the data sets may be unfamiliar to the processing system. In this context, the term "unfamiliar" is intended to refer to data sets which have no standardised or commonly known structure or labelling, or which have not been previously processed and/or understood by the data processing system.

Figure 2A:
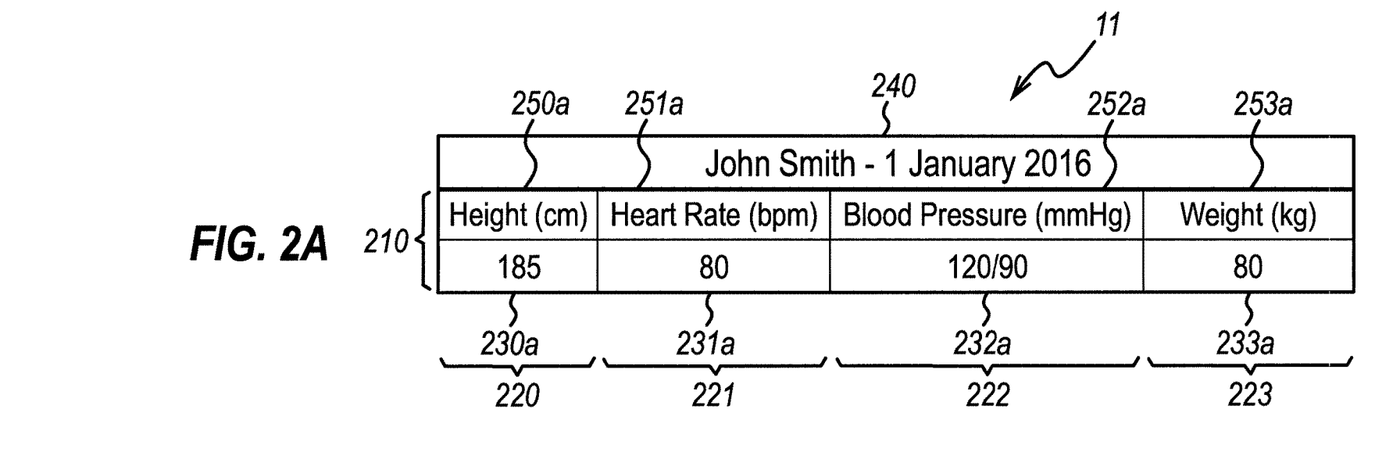
FIG. 2A illustrates one example of an input data set.
Figure 2B:
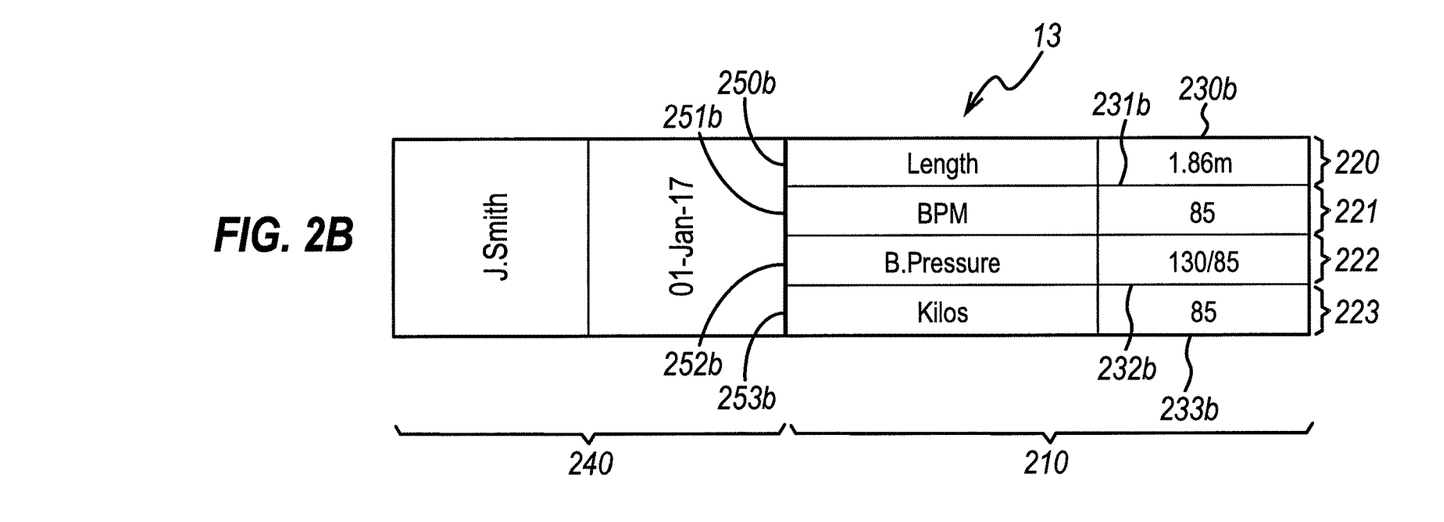
FIG. 2B illustrates another example of an input data set.

FIGS. 2A and 2B illustrate two different examples of input data sets, in which FIG. 2A illustrates a first table 11 and FIG. 2B illustrates a second table 13. Each of the tables 11, 13 relate to the same type 210 of data, which in this case is the biometric data of a patient recorded on two different days. The type 210 of data is defined by a general data label 240, which defines the name of the patient and the date upon which the biometric data was recorded.

There are a number of different categories 210, 221, 222, 223 of data in each of the tables 11, 13. In this example, there are four different categories of data: "Height of Patient" 220, "Patient Heart Rate" 221, "Patient Blood Pressure" 222 and "Patient Weight" 223. These different categories of data, may be associated with a data label.

In the first table 11, the "Height of Patient" 220 category is associated with the "Height (cm)" data label 250a, the "Patient Heart Rate" 221 category is associated with the "Heart Rate (bpm)" data label 251a, the "Patient Blood Pressure" 222 category is associated with the "Blood Pressure (mmHg)" data label 252a, and the "Patient Weight" 223 category is associated with the "Weight (kg)" data label 253a.

In the second table 13, the "Height of Patient" 220 category is associated with the "Length" data label 250b, the "Patient Heart Rate" 221 category is associated with the "BPM" data label 251b, the "Patient Blood Pressure" 222 category is associated with the "B. Pressure" data label 252b, and the "Patient Weight" 223 category is associated with the "Kilos" data label 253b.

In first table 11 and the second table 13, each one of the data labels is associated with a corresponding data item 230a-233a, 230b-233b. In addition, each data item may comprise a value or a character string indicative of information relating to the data label of a particular category in a particular type of data. For instance, the "Height (cm)" data label 250a is associated with the "185" data item 231a, which indicates that the patient, "John Smith" was 185 cm tall on 1 Jan. 2016.

One or more of the data labels 250a-253a, 250b-253b may be unfamiliar to the system in that one or more of the data labels may not correspond to the labelling structure that the system uses. For instance, a data label may be "unrecognised" in that the system has not stored this label previously. In another example, a data label may be "undefined" in that the system has previously stored this label, but that label is not comprised within the desired labelling structure of the system.

Figure 1:
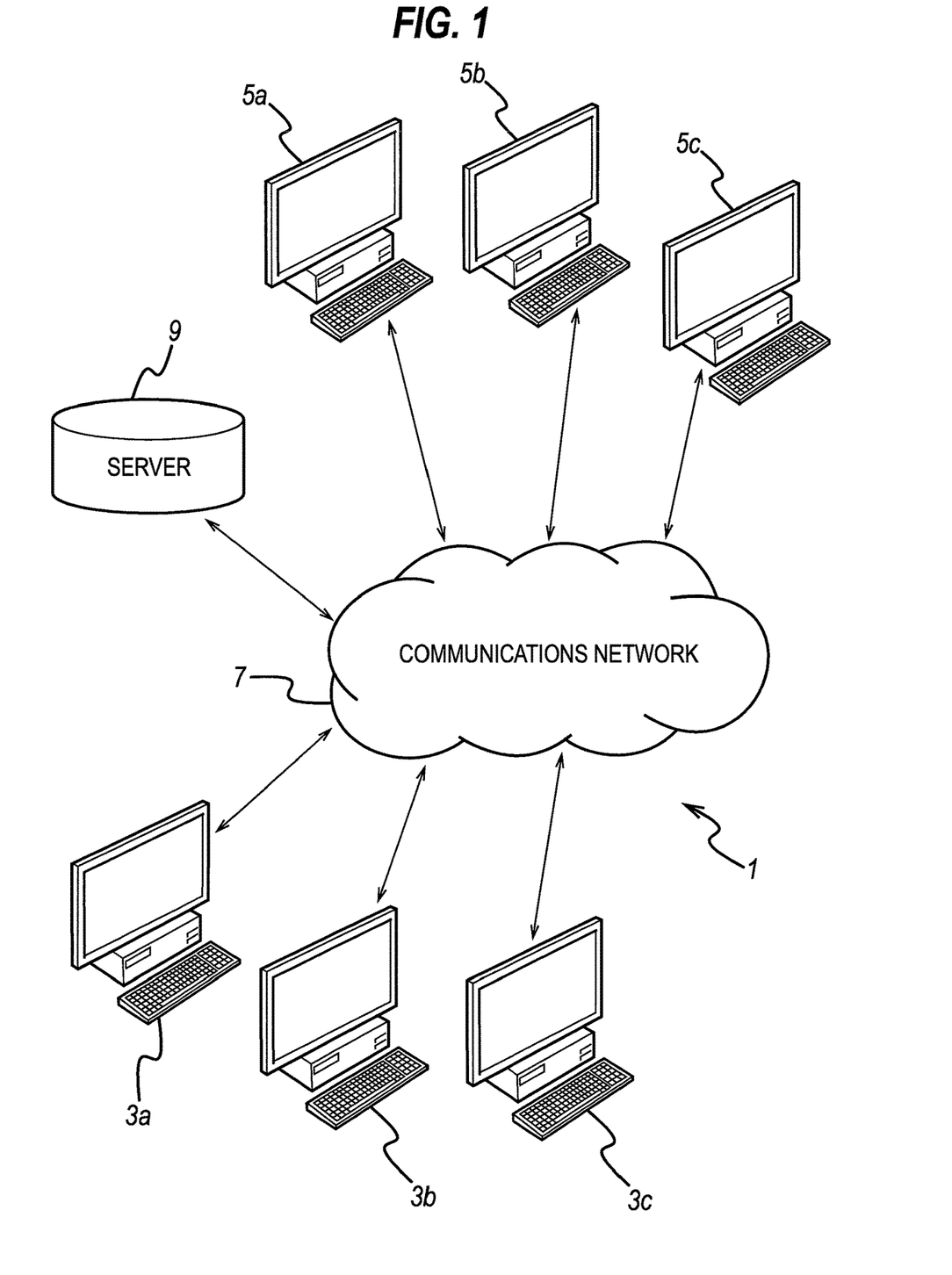
FIG. 1 is a schematic of a system for outputting modified input data for storage.

The system and methods described herein process the data labels in one given data set with a synonyms database, such that data categories and types of data which correspond or equate to one or more other data sets can be identified in the given data set. With the disclosed processing systems and methods, it is possible to receive data sets from various sources and output data sets with a common labelling structure. Thus, it is possible to compare and/or aggregate data sets in a more accurate manner. The systems and methods provide prompts to a user for confirmation and/or selection of data labels FIG. 1 illustrates the general architecture of a system for modifying input data for storage at a storage device, such as at a database of a server. The system 1 may comprise any number of transmitting devices 3a, 3b, 3c arranged to provide data to any number of receiving devices 5a, 5b, 5c via a communications network 7 and a server 9.

The communications network 7, in this example, is the Internet 7. However, it will be appreciated that any suitable form of communications network could be used.

In this example, the transmitting devices 3a, 3b, 3c and the receiving devices 5a, 5b, 5c can both receive and transmit data. Each one of the devices 3a-c, 5a-c can be any type of computing device such as a desktop computer, a laptop computer, a tablet, a smart-phone or similar.

The devices 3a-c, 5a-c are web-enabled by including an embedded browser or "app" or similar. In addition, each device 3a-c, 5a-c comprises a display, a user interface, a processor and memory. The server 9 comprises a memory and a processor.

The devices 3a-3c, 5a-c and the server 9 can be arranged to communicate data to one another via any suitable communications protocol or connection. For instance, the devices 3a-3c, 5a-c and server 9 may communicate with one another via a wired and/or a wireless connection.

In the following example, users of two different transmitting devices 3a-c may wish to make data available to the users of the receiving devices 5a-5c. For instance, a user of a first device 3a may wish to provide the data illustrated in FIG. 2A to other users in the system 1. In this example, the user of the first device 3a is a medical practitioner at a hospital.

Referring to FIG. 2A, there is a relational database 11, otherwise known as a "table". In this case, the table 11 may be referred to as having a "horizontal" orientation because the headings in the table 11 are arranged in a row, or "horizontally". The data in this embodiment, which is provided only by way of example, comprises biometric data relating to a person, "John Smith".

As illustrated in FIG. 2A, the biometric data comprises data regarding John Smith's height, heart rate, blood pressure and weight. The data in this example, was collected on 1 Jan. 2016, as specified in the table.

In this example, a user of a second device 3b may wish to provide a different data set, such as the data set illustrated in FIG. 2B, to other users in the system 1 for aggregation and/or comparison with the data set in FIG. 2A. In this example, the user of the second device 3b is also a medical practitioner, but is located at a different hospital to the user of the first device 3a.

Referring to FIG. 2B, there is a similar table 13 to that in FIG. 2A. However, in this case, the table in FIG. 2B may be referred to as having a "vertical" orientation because the headings in the table 13 are arranged in a column, or "vertically". Both tables 11, 13 show the same types of data for the same person. However, the table 13 in FIG. 2B uses different labels 250b-253b in comparison to those in FIG. 2A. Thus, if the data in both tables 11, 13 were uploaded to the server 9 in order for the data to be aggregated and/or compared, and if a conventional system were used, the server 9 may not be able to accurately establish that the data is suitable for comparison. For instance, it would be desirable for the server 9 to generate a scatter plot showing how the person's biometric data varied over time. In addition, it would be desirable for the data to be aggregated into a single relational database, as opposed to two separate ones. However, errors are likely to be introduced if the data in the tables 11, 13 were to be compared or aggregated in their current form. For example, the server 9 is unlikely to be able to identify that the "Height (cm)" referred to in the first column of the table 11 of FIG. 2A is comparable with the "length" referred to in the first row of table 13 of FIG. 2B.

A computer-implemented method of operation of the system shown in FIG. 1 will now be described. This method, which is described below with reference to FIGS. 3 and 4, is carried out on at least one of the transmitting devices 3a-c, at least one of the receiving devices 5a-5c, and at least one server 9 via the communications network 7.

Figure 3:
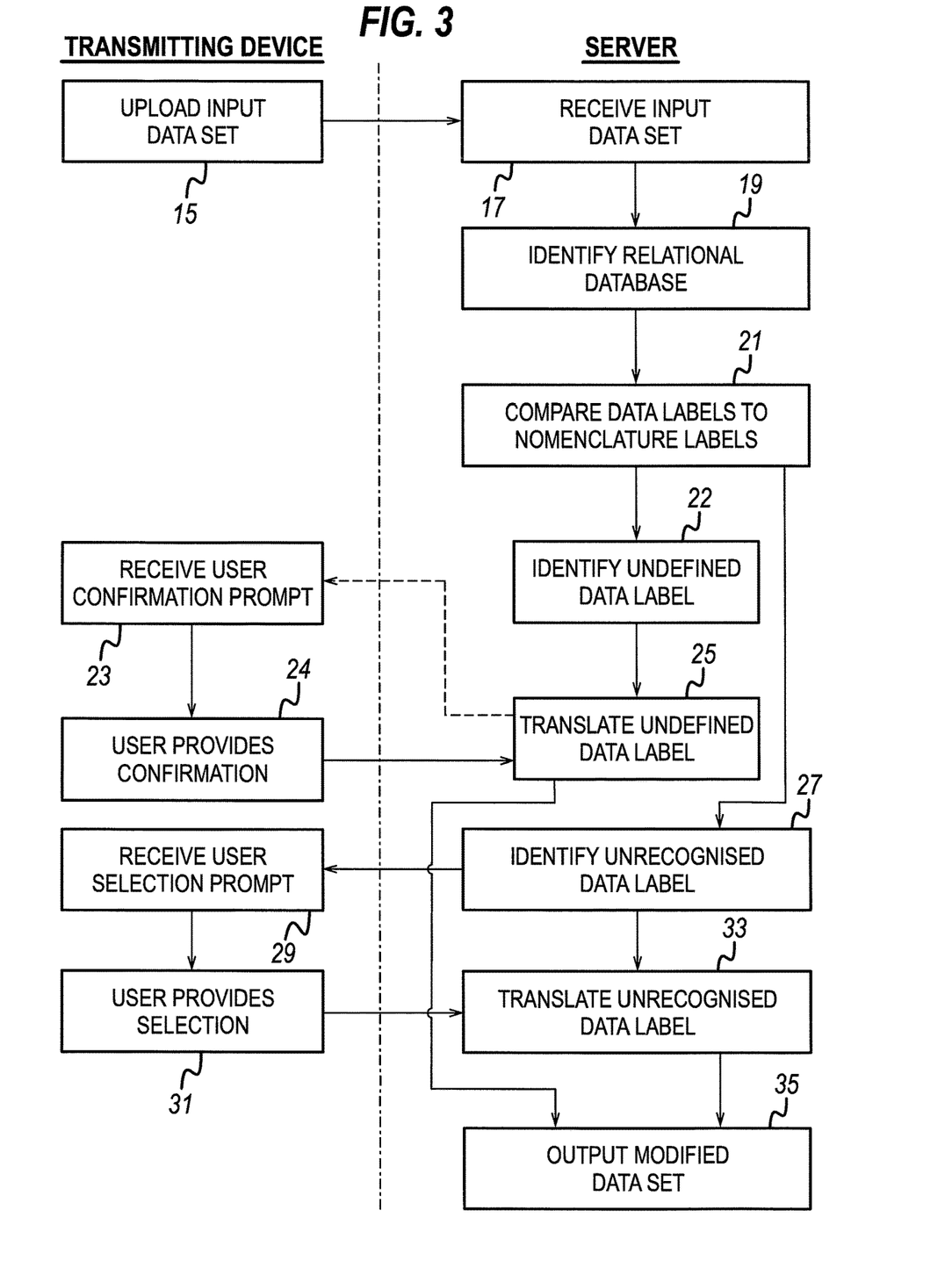
FIG. 3 is a flow chart illustrating a method of outputting modified input data.
Figure 4:
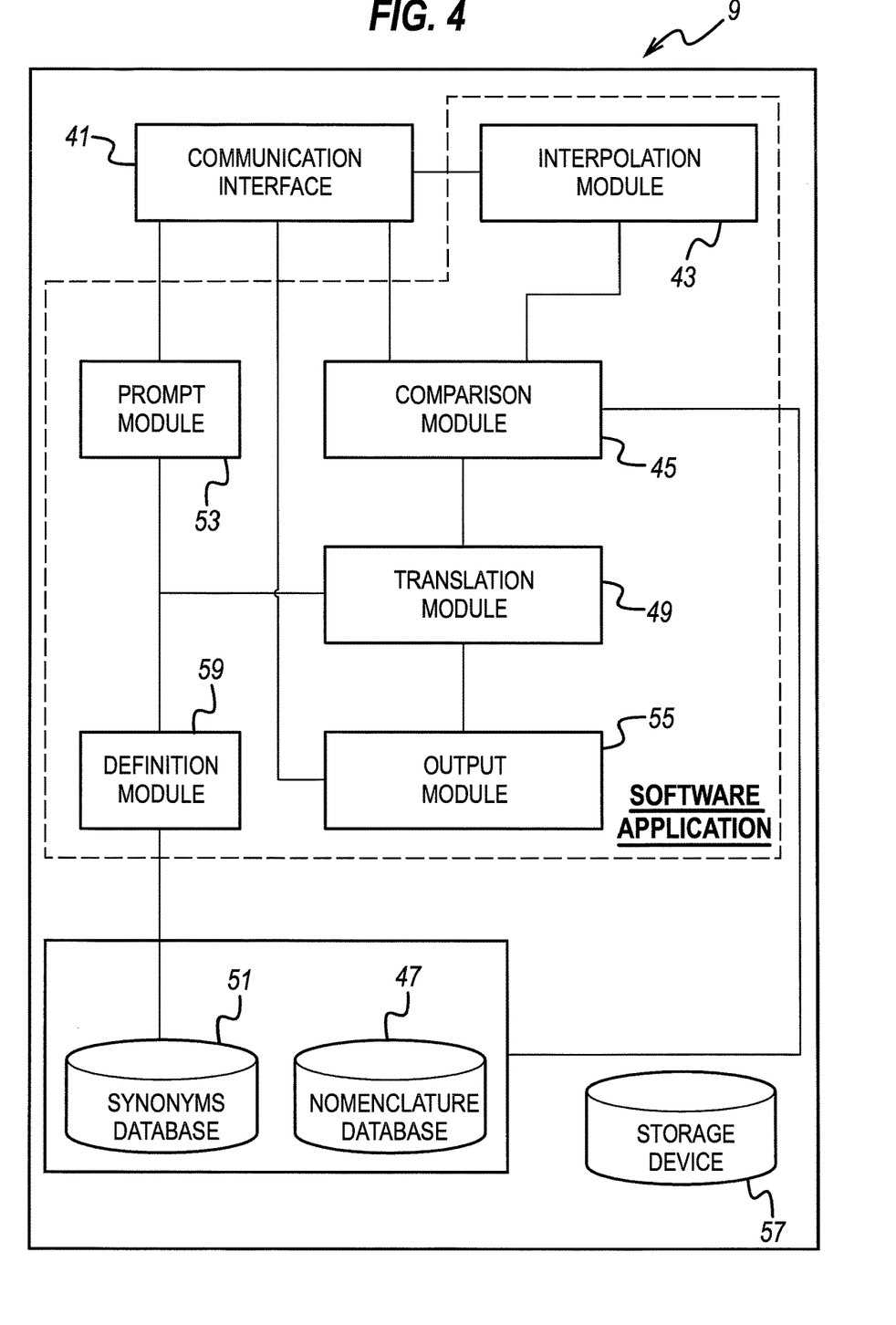
FIG. 4 is a schematic of some features of the system of FIG. 1.

FIG. 3 shows a flow chart illustrating, at an overview level, a method of outputting modified input data. FIG. 4 illustrates, in schematic form, an overview of the features of the server 9.

In step 15, there is an input data set stored in the memory of the transmitting device 3a. In this example, the input data may be the table 11 which is described above with reference to FIG. 2A. However, the skilled person would appreciate that any other data could be used, as mentioned above. This input data set 11 is uploaded by a user of the transmitted device 3a to the server 9. Accordingly, in step 17 the server 9 receives the input data set, via a communication interface 41 at the server 9.

In step 19, the server 9 uses an interpretation module 43 to identify the relational database 11 (or "table") in the input data. The server 9 may identify the table 11 by identifying the cells in the input data which are populated, for instance, with a character string or a value, and by identifying the boundary of the table 11 by identifying the cells in the input data which are not populated, or are "blank".

In addition, data labels 250a-253a may be identified in the table 11 by identifying cells comprising text, or cells comprises text only. For example, the input data of FIG. 2A comprises the data labels "Height (cm)", "Heart Rate (bpm)", "Blood Pressure (mmHg)", "Weight (kg)", as well as a general data label 240 for the data "John Smith—1 Jan. 2016".

In this case, the input data set comprises a first time stamp (i.e. 1 Jan. 2016). The interpretation module 43 can extract the first time stamp, which can then be associated with output data set. This allows output data sets to be compared with one another in the time domain. For instance, the interpretation module 43 may recognise the time stamp by identifying that the text is in form date/month/year. However, the interpretation module 43 may utilise any other suitable mechanism for extracting a time stamp from the input data. For example, the input data may comprises metadata which includes a time stamp.

In step 19, the interpretation module 43 may also determine the orientation of the table 11 in the input data. For instance, the interpretation module 43 may be arranged to identify a row of cells comprising text, such as in the table 11 in FIG. 2A and, in response, determine that the relational database 11 has a horizontal orientation. Once the orientation of the table 11 has been determined, the orientation can be used to more accurately identify the location of data labels 250a-253a and the data items 231a-233a corresponding with the labels 250a-253a in the input data.

For instance, the server 9 can determine that a particular cell comprises a data label 250a-253a if that cell comprises text and is adjacent another cell comprising text in its row. Thus, the server 9 can determine that the table 11 has a horizontal orientation. In addition, the server 9 can determine that a particular cell comprises data related to a data label 250a-253a if that cell comprises a number and is adjacent another cell comprising a number in its column. Further, the server 9 can establish that if a cell comprises text, and if that cell is in a column which comprises a plurality of cells of numbers, then, the cell comprises a data label 250a-253a that is associated with the numerical data in the column.

In step 21, the server 9 uses a comparison module 45 to compare the data labels 250a-253a of the input data to a plurality of nomenclature-labels in a nomenclature database 47, which is accessible by the server 9. The nomenclature database 47 is a database or data structure which defines a plurality of data labels. These data labels are labels that are to be used in the output data, so that the data output from the server 9 can be given a common labelling structure (or "nomenclature"). Then, in step 22, the comparison module 45 identifies a data label 250a-253a that is not present in the nomenclature database 47 based on the comparison.

In the example of data given in FIG. 2A, the data label "Height (cm)" 250a may be not present in the nomenclature database 47. Therefore, the "Height (cm)" data label 250a is identified as being undefined and is thus a target for translation in to a label in the nomenclature database 47.

The data label 250a that is not present in the nomenclature database 47 will be referred to herein as an "undefined data label". In this case, the term "undefined data label" is used in order to avoid confusion in this description with other data labels in the data, and this data label is referred to as being "undefined" in so far as it is not present in the nomenclature database 47.

In step 25, a translation module 49 translates the undefined data label 250a into a nomenclature-label using a synonyms database 51 at the server 9. The synonyms database 51 comprises a plurality of synonym-labels each of which correspond with a nomenclature-label. The step of translating comprises identifying a synonym-label corresponding with the undefined data label 250a, selecting the nomenclature-label associated with the identified synonym-label, and translating the undefined data label into the selected nomenclature-label.

To use the example above, the translation module 49 searches the synonyms database 51 to identify the undefined data label "Height (cm)" 250a in the database of synonyms-labels. In this case, a match is found with a synonyms-label "Height (cm)". This synonyms-label is associated with a corresponding nomenclature-label "Height of Patient". This nomenclature-label, "Height of Patient" is selected for translating the undefined data label "Height (cm)" 250a.

A similar process can be used to select nomenclature labels: "Patient Heart Rate", "Patient Blood Pressure" and "Patient Weight" for translating the following labels in the data respectively: "Heart Rate (bpm)" 251a, "Blood Pressure (mmHg)" 252a and "Weight (kg)" 253a.

In step 23, the server 9 may optionally transmit a confirmation prompt to the user of the transmitted device 3a, via the communication interface 41 and a prompt module 53 at the server 9. This confirmation prompt comprises a message which is received at the transmitting device 3a and displayed to the user. In response to the confirmation prompt, the user provides a confirmation of the nomenclature-label which has been selected for translating the undefined data label. This confirmation feedback is provided from the user via the user interface at the transmitting device 3a.

In this example, the prompt comprises a message indicative of the server 9 selecting the nomenclature label "Height of Patient" for translating the label 250a "Height (cm)" in the input data. The prompt provides the user with the opportunity to inform the system whether this translation is appropriate. If the translation is appropriate the user can provide their confirmation. However, if the undefined data label does not accurately correspond with the server's selection, the user can disapprove of the selection via the user interface of the transmitting device.

This process, allows the user to improve the accuracy of the selection of labels for translation. The user may provide the confirmation via a user interface device, such as a touch screen, at the transmitted device 3a. However, other suitable means could be used for receiving the confirmation. For instance, the transmitting device 3a may comprise a microphone and voice recognition software arranged to received and identify a voice command as the confirmation from the user. The server 9 may provide a confirmation prompt in connection with any number of the selected nomenclature labels. Alternatively, the server 9 may proceed with translation without requesting intervention from the user.

In the example of the server 9 illustrated in FIG. 4, the nomenclature database 47 and the synonyms database 51 are at the server 9. However, the skilled person will appreciate that the nomenclature database 47 and/or the synonyms database 51 could be separate from the server 9, at a different device or server. However, in any case access to the nomenclature database 47 and/or the synonyms database 51 is provided to server 9, either directly or indirectly.

If steps 23 and 24 are followed, step 25 would include the step of receiving the confirmation or disapproval of the selected nomenclature-label for translation. In the event that a confirmation is received, the translation module 49 translates the undefined data label into the selected nomenclature-label that has been confirmed by the user. In the event that a disapproval is received, the translation module 49 may select an alternative nomenclature-label for translation. The alternative nomenclature label may, again, be presented to the user for confirmation/disapproval. In one example, the confirmation is provided by the user that uploaded the input data, which improves the accuracy of the confirmation because that user is most likely to have a good understanding of the data being uploaded.

In step 35, an output module 55 at the server 9 outputs a modified data set based on the input data set and the translation made in step 25. This output step may involve modifying the original input data set in order to include the translated data label. However, the output step could generate an additional copy of the input data set that has been modified to include the nomenclature-label instead or in addition to the undefined data label 250a. In either case, the output module 55 outputs a modified data set that is based on the input data set and the translated undefined label. The modified data set may be stored at a storage module 57 at the server 9 and/or at a storage device at another computer devices such as one or more of the receiving or transmitting devices 3a-c, 5a-c.

The method of outputting modified input data described above with reference to FIGS. 3 and 4, may be operated in connection with multiple input data sets. These input data sets could be received from many different parties, such as any number of the transmitting devices 3a-c. However, in the example described below a user of a second transmitting device 3b uploads the input data described with reference to FIG. 2B. The method and system allows this input data to be aggregated and/or combined with the input data described with reference to FIG. 2A.

In this example, step 15, step 17 and step 19 are executed in the same way as described above, except with a different input data set. In step 19, the server 9 may use the interpretation module 43 to identify the relational database 13 (or "table") in the input data, in a similar manner to that described previously. In addition, the interpretation module 43 may determine that the input data of FIG. 2B comprises the data labels "Length" 250b, "BPM" 251b, "B. Pressure" 252b, "Kilos" 253b, as well as a general data labels 240 for the data: "J. Smith" and "1 Jan. 2016".

In this case, the input data set of FIG. 2B comprises a second time stamp (i.e. 1 Jan. 2016). The interpretation module 43 can extract the second time stamp, which can then be associated with output data set. This allows the output data sets associated with the data of FIGS. 2A and 2B to be compared with one another in the time domain.

As illustrated in FIG. 2B, the table 13 in the input data has a different orientation to that in FIG. 2A. Since the data labels 250b-253b are arranged in a column, the table 13 may be described as having a "vertical" orientation. Therefore, in step 19, the interpretation module 43 may be arranged to identify a column of cells comprising text, such as those in the table 13 in FIG. 2B and, in response, determine that the relational database 13 has a vertical orientation. Once the orientation of the table 13 has been determined, the orientation can be used to more accurately identify the location of data labels 250b-253b and the data items corresponding with the labels 250b-253b in the input data.

In this example, the data comprises a data label which is not present in the nomenclature database 47 and which is not present in the synonyms database 51. In this case, in step 21, the comparison module 45 may compare the data labels 250b-253b of the input data to the nomenclature-labels of the nomenclature-database 47, as well as the synonym-labels of the synonyms-database 51. Then, the method proceeds to step 27 in which the comparison module 45 identifies a data label that is not present in the nomenclature database 47 or synonyms base 51 based on the comparison.

The data label that is not present in either the nomenclature database 47 or the synonyms-database 51 will be referred to herein as an "unrecognised data label". In this case, the term "unrecognised data label" is used in order to avoid confusion in this description with other data labels in the data, and this data label is referred to as being "unrecognised" in so far as it is not present in the nomenclature database 47 or the synonyms-database 51.

In the example, of data given in FIG. 2B, the data label "BPM" 25 lb may be not present in the nomenclature database 47 or the synonyms database 51. Therefore, the "BPM" data label 251b is identified as being unrecognised and is thus a target for translation into a label in the nomenclature database.

In step 29, the server 9 transmits a selection prompt to the user of the transmitting device 3b, via the communication interface 41 and the prompt module 53. This selection prompt is a message which is received at the transmitting device 3a and displayed to the user. In this case, the selection prompt provides the user with a selectable list of nomenclature-labels, which may correspond with the unrecognised label "BPM" 251b. This list may be a selection of the most likely matches with the unrecognised data label 251b. Alternatively, the selection prompt may comprise all of the nomenclature labels, so the user has all possible choices of label to select.

In step 31, the user provides a selection of the nomenclature-label which the user considers most appropriate for translating the unrecognised data label. This selection feedback is provided from the user via the user interface at the transmitting device 3a.

In this example, the selection prompt comprises a message indicative of all possible nomenclature-labels, one of which is "Patient Heart Rate". The user selects the "Patient Heart Rate" nomenclature label for translating the unrecognised label "BPM". Then this selection is sent to the translation module 49 in step 33. In this step, the "BPM" label is translated into the selected label "Patient Heart Rate".

The user selection of the nomenclature label can be used to update the synonyms-database 51 using a definition module 59 at the server 9. In this step, the definition module 59 is arranged, in response to the user selection, to define a synonym-label in the synonyms database corresponding with the selected nomenclature-label based on the unrecognised label. In the example described above, the definition module 59 would create a synonym-label "BPM" in the synonyms-database. This synonym-label is generated in association with the "Patient Heart Rate" nomenclature label. Thus, when a future input data set comprises the data label "BPM" 251*b*, the system will be able to determine that the "BPM" label 251*b* should be translated to the "Patient Heart Rate" nomenclature label. In this way, the system is able to "learn" the likely translations between data labels for future data-sets. When the steps of the methods are repeated over time with different data sets, the translation will become more accurate and will require fewer user interactions.

In step 35, the output module 55 outputs a modified data set based on the input data set and the translation made in step 33. However, if in step 25 an undefined label 250*a* has been translated then the modified data set is output based on this translation also. Alternatively, the input data set may comprise data labels all of which correspond directly to nomenclature labels. In this case, none of the translating process in method would be required.

As explained previously, the output module 55 outputs a modified data set that is based on the input data set and the translated labels. The modified data set may be stored at a storage module 57 at the server 9 and/or at a storage device at another computer devices such as one or more of the receiving or transmitting devices 3*a-c*, 5*a-c*.

Once the data has been modified and stored it is possible to aggregate and/or compare different data sets with one another. For instance, the two data sets relating to the patient, "John Smith", may be aggregated and compared via a scatter plot showing the changes in the patient's biometric data over time. It will be apparent to the skilled person that the methods and systems described herein are able to receive many input data sets in order to provide a more detailed representation of the data over time.

To carry forward the example described in detail above, the patient "John Smith" may have visited a number of different medical practitioners at different moments over a number of years, in order to have his biometric data measured. Two examples of the data measured at these visits are shown in FIGS. 2A and 2B. However, in this example there are many more data sets that have been produced for John Smith's biometrics in the past.

Figure 5:
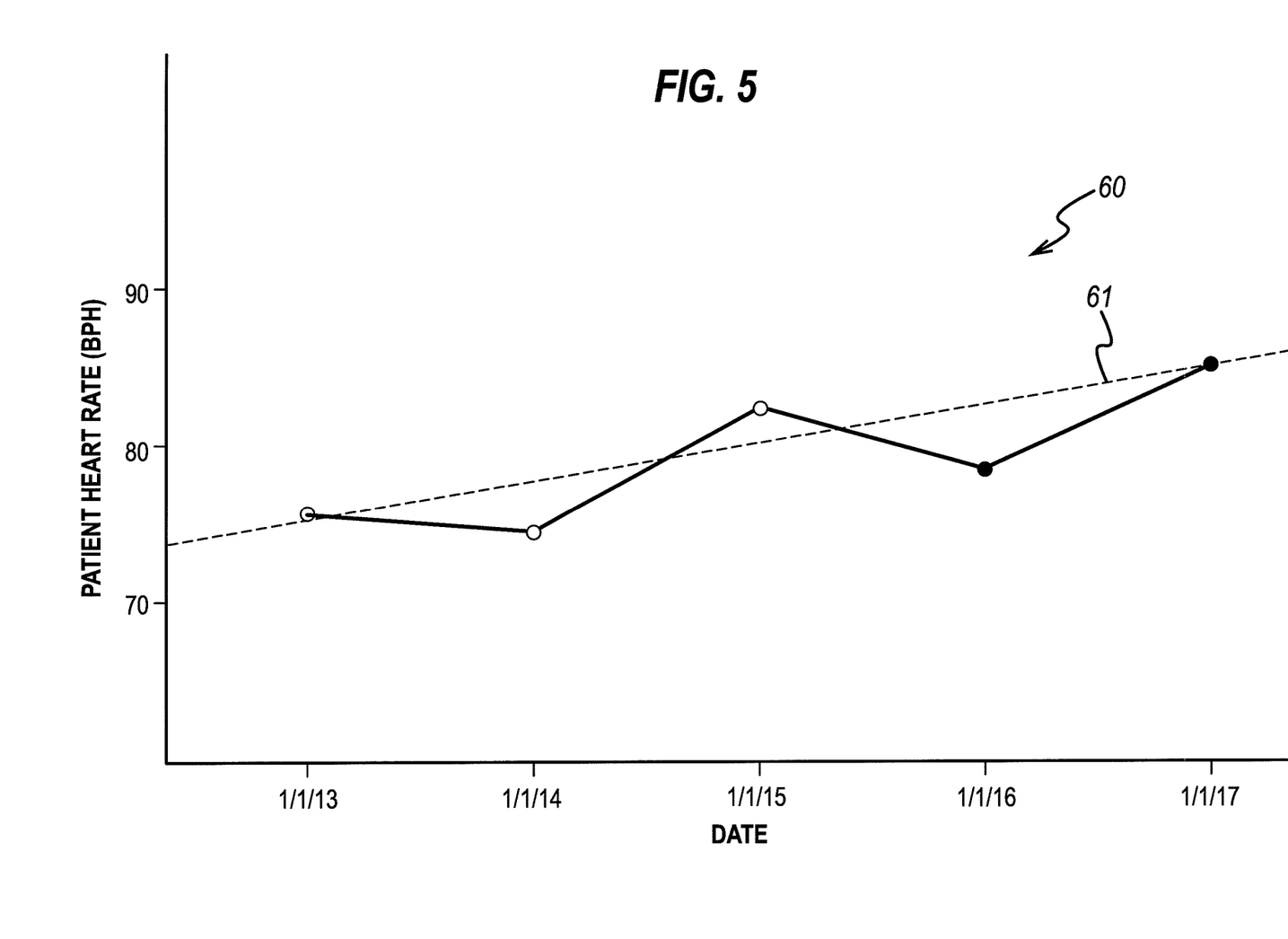
FIG. 5 illustrates a comparison of aggregated data sets.

Each medical practitioner in this example uses a different labelling scheme for the data that they have measured. However, the systems and methods described herein allow the different data sets to be aggregated and compared in an accurate and efficient manner, irrespective of the differences in the labelling schemes. One example of this is illustrated in FIG. 5, which shows a scatter plot 60 of John Smith's heart rate as recorded between 2013 and 2017 by the different medical practitioners. This comparison may be generated at the server 9 or any one of the transmitting/receiving devices 3*a-c*, 5*a-c*, based on the outputs of the method described with reference to FIGS. 1-4.

As illustrated in FIG. 5, the aggregation and comparison of the data sets allows meaningful conclusions to be draw from the data. For instance, a trend line 61 can be calculated which shows that the patient's heart rate is generally increasing over time. This may enable a medical practitioner to take an appropriate medical response based on the data.

It will be appreciated that the modules described herein may be implemented in hardware or in software. Furthermore, the modules may be implemented at various locations throughout the system. For instance, any one of the modules illustrated in FIG. 4 may be distributed throughout the system at different servers or devices.

The term "comprising" encompasses "including" as well as "consisting" e.g. a composition "comprising" X may consist exclusively of X or may include something additional e.g. X+Y. Unless otherwise indicated, each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software.

Although an example is provided herein which relates to biometric data, it will be appreciated that the systems and methods described herein are suitable for any type of data. For instance, instead of biometric data, the methods and systems described herein could be used for any type of data relating to any particular subject of interest. For instance, the data may be scientific data, statistical data, research data, financial data etc.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of the invention.

EMBODIMENTS

1. A system for outputting modified input data for storage, the system comprising:
a communication interface arranged to receive an input data set comprising a plurality of data labels;
a comparison module arranged to compare the data labels to a plurality of nomenclature-labels in a nomenclature database; and arranged to identify an undefined data label by determining that at least one of the data labels is not present in the nomenclature database, based on the comparison; and
a translation module arranged to translate the undefined data label into a nomenclature-label using a synonyms database comprising a plurality of synonym-labels each corresponding with a nomenclature-label, wherein the translating comprises identifying a synonym-label corresponding with the undefined data label, and selecting the nomenclature-label associated with the identified synonym-label for translating the undefined data label; and
an output module arranged to output a modified data set based on the input data set and the translated undefined label for storage.

2. The system of embodiment 1 wherein the translating comprises receiving, via the communication interface, a user confirmation of the selected nomenclature-label.

3. The system of embodiment 2 wherein the input data set is received, via the communication interface, from a first user; and
the user confirmation is received from the first user.

4. The system of any preceding embodiment wherein the modified data set is output to a second user, different from the first user, via the communication interface.

5. The system of any preceding embodiment wherein the comparison module is arranged to compare the data labels to the nomenclature-labels and the synonym-labels; and arranged to identify an unrecognised label by determining that at least one of the data labels is not present in the nomenclature database or the synonyms database, based on the comparison;
the translation module is arranged to translate the unrecognised label by receiving, via the communication interface, a user selection of a nomenclature-label from the nomenclature database; and
the output module is arranged to output the modified data set based on the input data set, the translated undefined label and the translated unrecognised label.

6. The system of embodiment 5 wherein the input data set is received, via the communication interface, from a first user; and
the user selection is received from the first user.

7. The system of embodiment 5 or embodiment 6 further comprising:
a definition module arranged, in response to the user selection, to define a synonym-label in the synonyms database corresponding with the selected nomenclature-label based on the unrecognised label.

8. The system of any preceding embodiment further comprising:
a prompt module arranged to present the user with a plurality of nomenclature-labels for selection;
wherein the prompt module is arranged, in response to receiving a selection from the user of a nomenclature-label, to translate the unrecognised label or the undefined label into the selected nomenclature-label.

9. The system of any preceding embodiment wherein the communication interface is arranged to receive a first input data set and a second input data set, each comprising a plurality of data labels;
the comparison module is arranged to compare the data labels of the data sets to a plurality of nomenclature-labels in a nomenclature database; and
the output module is arranged to output a modified first data set and a modified second data set based on the first and second input data sets and the translated undefined label.

10. The system of embodiment 9 wherein the first input data set and the second input data set are received from two different users, via the communication interface.

11. The system of embodiment 9 or embodiment 10 wherein the first input data set comprises a first time stamp, and the second input data set comprises a second time stamp; and the system further comprises:
an interpretation module arranged to extract the first time stamp and the second time stamp; and arranged to associate the modified first data set with the first time stamp, and the modified second data set with the second time stamp.

12. The system of any preceding embodiment wherein the input data comprises a relational database comprising columns and rows of cells.

13. The system of embodiment 12 further comprising:
an interpretation module arranged to identify the relational database in the input data.

14. The system of embodiment 13 wherein the interpretation module is arranged to identify a row of cells comprising text and, in response, determine that the relational database has a vertical orientation.

15. The system of any one of embodiments 13 to 14 wherein the interpretation module is arranged to identify a column of cells comprising text and, in response, determining that the relational database has a horizontal orientation.

16. The system of embodiment 14 or embodiment 15 wherein the interpretation module is arranged to use the determined orientation to identify data labels and/or data items in the input data.

17. The system of any preceding embodiment wherein each data label is associated with a data item comprising at least one value or at least one character string.

18. A computer-implemented method of outputting modified input data for storage, the method comprising:
receiving an input data set comprising a plurality of data labels;
comparing the data labels to a plurality of nomenclature-labels in a nomenclature database;

identifying an undefined data label by determining that at least one of the data labels is not present in the nomenclature database, based on the comparison; and translating the undefined data label into a nomenclature-label using a synonyms database comprising a plurality of synonym-labels each corresponding with a nomenclature-label;

wherein the translating comprises identifying a synonym-label corresponding with the undefined data label, and selecting the nomenclature-label associated with the identified synonym-label for translating the undefined data label; and outputting a modified data set based on the input data set and the translated undefined label for storage.

19. The method of embodiment 18 wherein the translating comprises:

receiving a user confirmation of the selected nomenclature-label.

20. The method of embodiment 19 wherein the input data set is received from a first user; and the user confirmation is received from the first user.

21. The method of any one of claims 18 to 20 wherein the modified data set is output to a second user, different from the first user.

22. The method of any one of claims 18 to 21 further comprising:

comparing the data labels to the nomenclature-labels and the synonym-labels;

identifying an unrecognised label by determining that at least one of the data labels is not present in the nomenclature database or the synonyms database, based on the comparison;

translating the unrecognised label by receiving a user selection of a nomenclature-label from the nomenclature database;

outputting the modified data set based on the input data set, the translated undefined label and the translated unrecognised label.

23. The method of embodiment 22 wherein the input data set is received from a first user; and the user selection is received from the first user.

24. The method of embodiment 22 or embodiment 23 further comprising:

in response to the user selection, defining a synonym-label in the synonyms database corresponding with the selected nomenclature-label based on the unrecognised label.

25. The method of any one of embodiments 18 to 24 wherein the translating comprises:

presenting the user with a plurality of nomenclature-labels for selection and, in response to the user selecting a nomenclature-label, translating the unrecognised label or the undefined label into the selected nomenclature-label.

26. The method of any one of embodiments 18 to 25 further comprising:

receiving a first input data set and a second input data set, each comprising a plurality of data labels; and comparing the data labels of the data sets to a plurality of nomenclature-labels in a nomenclature database; and outputting a modified first data set and a modified second data set based on the first and second input data sets and the translated undefined label.

27. The method of embodiment 26 wherein the first input data set and the second input data set are received from two different users.

28. The method of embodiment 26 or embodiment 27 wherein the first input data set comprises a first time stamp, and the second input data set comprises a second time stamp;

extracting the first time stamp and the second time stamp; and associating the modified first data set with the first time stamp, and the modified second data set with the second time stamp.

29. The method of any one of embodiments 18 to 28 wherein the input data comprises a relational database comprising columns and rows of cells.

30. The method of embodiment 29 further comprising:

identifying the relational database in the input data.

31. The method of embodiment 29 or embodiment 30 further comprising:

identifying a row of cells comprising text and, in response, determining that the relational database has a vertical orientation.

32. The method of any one of embodiments 29 to 31 further comprising:

identifying a column of cells comprising text and, in response, determining that the relational database has a horizontal orientation.

33. The method of embodiment 31 or embodiment 32 further comprising:

using the determined orientation to identify labels and/or data value in the input data.

34. The method of any one of embodiments 19 to 33 wherein each data label is associated with a data item comprising at least one value or at least one character string.

35. A computer program comprising code portions which when run on a computer cause the computer to carry out the method of any one of embodiments 19 to 34.

36. A computer-readable data carrier having stored thereon the computer program of embodiment 35.

The invention claimed is:

1. A system for outputting modified input data for storage, the system comprising:

a communication interface arranged to receive an input data set comprising a plurality of data labels;

a comparison module arranged to compare the data labels to a plurality of nomenclature-labels in a nomenclature database; and arranged to identify an undefined data label by determining that at least one of the data labels is not present in the nomenclature database, based on the comparison; and a translation module arranged to translate the undefined data label into a nomenclature-label using a synonyms database comprising a plurality of synonym-labels each corresponding with a nomenclature-label, wherein the translating comprises identifying a synonym-label corresponding with the undefined data label, and selecting the nomenclature-label associated with the identified synonym-label for translating the undefined data label; and an output module arranged to output a modified data set based on the input data set and the translated undefined label for storage, wherein the comparison module is arranged to compare the data labels to the nomenclature-labels and the synonym-labels; and arranged to identify an unrecognised label by determining that at least one of the data labels is not present in the nomenclature database or the synonyms database, based on the comparison;

the translation module is arranged to translate the unrecognised label by receiving, via the communication interface, a user selection of a nomenclature-label from the nomenclature database; and the output module is arranged to output the modified data set based on the input data set, the translated undefined label and the translated unrecognised label.

2. The system of claim 1 wherein the translating comprises receiving, via the communication interface, a user confirmation of the selected nomenclature-label.

3. The system of claim 2 wherein the input data set is received, via the communication interface, from a first user; and the user confirmation is received from the first user.

4. The system of claim 3 wherein the modified data set is output to a second user, via the communication interface, wherein the second user is not the first user.

5. The system of claim 1 wherein the input data set is received, via the communication interface, from a first user; and the user selection is received from the first user.

6. The system of claim 1 further comprising:

a definition module arranged, in response to the user selection, to define a synonym-label in the synonyms database corresponding with the selected nomenclature-label based on the unrecognised label.

7. The system of claim 1 further comprising:

a prompt module arranged to present a user with a plurality of nomenclature-labels for selection;

wherein the prompt module is arranged, in response to receiving a selection from the user of a nomenclature-label, to translate the unrecognised label or the undefined label into the selected nomenclature-label.

8. The system of claim 1 wherein the communication interface is arranged to receive a first input data set and a second input data set, each comprising a plurality of data labels;

the comparison module is arranged to compare the data labels of the data sets to a plurality of nomenclature-labels in a nomenclature database; and the output module is arranged to output a modified first data set and a modified second data set based on the first and second input data sets and the translated undefined label.

9. The system of claim 8 wherein the first input data set and the second input data set are received from two different users, via the communication interface.

10. The system of claim 8 wherein the first input data set comprises a first time stamp, and the second input data set comprises a second time stamp; and the system further comprises:

an interpretation module arranged to extract the first time stamp and the second time stamp; and arranged to associate the modified first data set with the first time stamp, and the modified second data set with the second time stamp.

11. The system of claim 1 wherein the input data comprises a relational database comprising columns and rows of cells.

12. The system of claim 11 further comprising:

an interpretation module arranged to identify the relational database in the input data.

13. The system of claim 12 wherein the interpretation module is arranged to identify a row of cells comprising text and, in response, determine that the relational database has a vertical orientation.

14. The system of claim 12 wherein the interpretation module is arranged to identify a column of cells comprising text and, in response, determining that the relational database has a horizontal orientation.

15. The system of claim 12 wherein the interpretation module is arranged to use the determined orientation to identify data labels and/or data items in the input data.

16. The system of claim 1 wherein each data label is associated with a data item comprising at least one value or at least one character string.

17. A computer-implemented method of outputting modified input data for storage, the method comprising:

receiving an input data set comprising a plurality of data labels;

comparing the data labels to a plurality of nomenclature-labels in a nomenclature database;

identifying an undefined data label by determining that at least one of the data labels is not present in the nomenclature database, based on the comparison; and translating the undefined data label into a nomenclature-label using a synonyms database comprising a plurality of synonym-labels each corresponding with a nomenclature-label;

wherein the translating comprises identifying a synonym-label corresponding with the undefined data label, and selecting the nomenclature-label associated with the identified synonym-label for translating the undefined data label; and outputting a modified data set based on the input data set and the translated undefined label for storage, wherein comparing includes comparing the data labels to the nomenclature-labels and the synonym-labels, wherein identifying includes identifying an unrecognised label by determining that at least one of the data labels is not present in the nomenclature database or the synonyms database, based on the comparison, wherein translating includes translating the unrecognised label by receiving a user selection of a nomenclature-label from the nomenclature database, and wherein outputting includes outputting the modified data set based on the input data set, the translated undefined label and the translated unrecognised label.

18. The method of claim 17 wherein the translating comprises:

receiving a user confirmation of the selected nomenclature-label.

19. The computer program comprising code portions which when run on a computer cause the computer to carry out the method of claim 18.

* * * * *